United States Patent [19]

Matuszak et al.

[11] Patent Number: 4,640,843

[45] Date of Patent: Feb. 3, 1987

[54] LOW FAT CONTENT FOOD CHIPS AND METHOD OF PREPARATION

[75] Inventors: Edward A. Matuszak, Liverpool; Yanien Lee, Manlius; Stephen R. Gillmore, Weedsport, all of N.Y.

[73] Assignee: Borden, Inc., Columbus, Ohio

[21] Appl. No.: 680,350

[22] Filed: Dec. 11, 1984

[51] Int. Cl.⁴ .............................................. A23L 1/01
[52] U.S. Cl. ................................... 426/560; 426/626; 426/440
[58] Field of Search ............... 426/626, 440, 439, 560, 426/550, 615, 618, 661, 438, 516, 517

[56] References Cited

U.S. PATENT DOCUMENTS

| | | |
|---|---|---|
| 2,002,053 | 5/1935 | Doolin . |
| 2,665,214 | 1/1954 | Scott . |
| 2,863,770 | 12/1958 | Spieser et al. . |
| 2,905,559 | 9/1959 | Anderson et al. . |
| 2,916,378 | 12/1959 | Kunce et al. . |
| 3,020,162 | 2/1962 | Cunningham et al. . |
| 3,083,103 | 3/1963 | Anderson et al. . |
| 3,131,063 | 4/1964 | Gerkens . |
| 3,278,311 | 10/1966 | Brown et al. . |
| 3,368,902 | 2/1968 | Berg . |
| 3,407,070 | 10/1968 | Murray et al. ........................ 426/661 |
| 3,937,848 | 2/1976 | Campbell et al. . |
| 4,124,727 | 11/1978 | Rockland et al. . |
| 4,126,706 | 11/1978 | Hilton . |

OTHER PUBLICATIONS

Rossen et al, 1973, Food Technology (Aug.) p. 46.
Matz, 1976, Snack Food Technology, AVI Publishing Co., Westport, Conn., pp. 144–149, 179–196.

Primary Examiner—Raymond N. Jones
Assistant Examiner—Carolyn Paden
Attorney, Agent, or Firm—Robbins & Laramie

[57] ABSTRACT

A food chip process that involves subjecting a comminuted starch-containing food composition having a controlled moisture content, illustratively, about 25 percent to about 40 percent by weight where a corn masa constitutes the food composition, to compression at a pressure of at least 1000 psig and at a temperature of no more than 110° F., and sequentially, and without drying, frying the compressed composition in an edible oil. The process relates, as well, where a corn masa is employed, to partial gelatinization of the corn used in preparation of the masa.

20 Claims, 2 Drawing Figures

LOW FAT CONTENT FOOD CHIPS AND METHOD OF PREPARATION

TECHNICAL FIELD

This invention pertains to low fat content fried food product chips prepared from a variety of flours and meal, and particularly, corn, and to a low temperature, high compression means for extrusion or sheeting of the dough or masa that is thereafter fried in oil.

BACKGROUND OF THE INVENTION

The production generally of food product chips by the formation of a ground dough or masa that is formed into ribbons and chips and deep-fried in oil is well known in the art.

The preparation of dough, where corn is employed, for example, and corn chips constitute the desired product, is accomplished generally by steeping of the corn in water to which calcium hydroxide has been added. The mixture is normally cooked, partially or substantially completely, with at least partial gelatinization, and the resulting mixture is then drained to remove the lime water and associated components occurring in the mixture whereupon the residual corn product is washed with additional water and ground to provide a moist dough or corn paste known as "masa". The masa is formed by a variety of known processes into ribbons or sheets by extrusion or sheeting, a step in which the masa is compressed, and subsequently formed into pieces that are fried to yield the desired chips.

The foregoing process, as generally described, has been varied, heretofore, to serve a number of different objectives with varying degrees of success.

In one embodiment, for example, the masa is formed into a thin sheet that is coated with a deposit of wheat flour to seal the masa, causing, it is asserted, a puffing or enlargement of the treated shell upon cutting thereof and cooking.

In a further embodiment, raw corn is cooked at 212° F. (100° C.) and at a neutral pH, to yield ultimately a sticky masa with undecomposed hulls that is mashed, in addition to being ground, to eliminate lumping within the masa and then passed through an extruder at high pressures but without regard to control of the elevated temperature induced by these high, but unspecified, pressures.

It has also been proposed that, in the formation of masa, the whole kernels of corn be cooked in a supersaturated solution of calcium hydroxide at elevated temperatures and pressures to, inter alia, abbreviate the period of time consumed in the initial process step and to more uniformly loosen the cellulosic shells or hulls from the kernels incorporated in the dough.

It has been known heretofore to produce a farinaceous ribbon of dough for frying and cutting into chips that includes extrusion of the dough at a pressure of 1500 to 2500 psi, but without any effort to control the temperature at which extrusion occurs. The objective in this instance has been, however, to secure a dough ribbon for frying of substantially uniform quality at a substantially constant rate that permits treatment of the dough ribbon recovered from the extruder in extended, uninterrupted lengths.

Means for effectively reducing the fat or oil content of food chips and particularly corn chips and potato chips has also been long sought so that the product chips would have properties of crispness and lightness while avoiding the oil heavy flavor and sogginess so readily communicated to these chips in the manufacturing process.

In one embodiment proposed to achieve the foregoing objectives, heating of the corn is undertaken, in the absence of lime, at a temperature ascending to about 170° F. (72° C.) to avoid the formation of a dough "too sticky to roll and cut". The dough formed in the process is ground and hydrated simultaneously, and sequentially heated at apparently reduced pressures, and thereafter substantially dehydrated at an elevated temperature, prior to cutting and frying to form product chips. The object of this latter embodiment is a reduced oil or fat content in the chips secured, but this objective is achieved by presenting to the heated oil of the frying step substantially dry pieces of dough or half product in which there is a minimal amount of water and a substantially fluid impervious membrane, and therefore a minimal opportunity for replacement of the residual water, as well as air, present, by oil.

In a further embodiment, potato chips, specifically, are prepared by passing an admixture of potato flour with water, through an extruder at an elevated temperature and a pressure of at least 6 atmospheres (i.e. 90 psi). The extruded half-product is dried prior to frying into finished chips.

A still further variation, employed heretofore in the production of corn chips of lower fat content, suggests the addition of oil or fat shielding agents, such as carboxymethyl cellulose to a masa after extrusion thereof and drying of the product recovered to a moisture content of around 10 percent before deep frying. The half-product of this embodiment attains a hard, dry, horny exterior before frying. The product chips are normally highly puffed.

It has also been proposed that corn dough prepared from dried raw corn steeped in an aqueous lime solution under pressure, be comminuted by a process of cutting, kneading and mixing that replaces conventional grinding. The comminuted product assumes a size that combines, it is theorized, with the release of zein, oils and the like from the corn, permitting a plasticization without undue stickiness, which would otherwise interrupt the continuous process the proposed embodiment is intended to provide. No suggestion is made in the description of this process of any means to reduce the fat or oil content of the product corn chips.

In the event, therefore, that fried food product chips, and particularly, corn chips, characterized by a light frangible quality could be secured having a reduced concentration of air spaces and the like with organoleptic properties including taste and texture and with a significantly reduced fat or oil content, a material step forward in the state of the art would be attained.

Were it possible, additionally, to produce these chips by a method that is efficient, continuous, and avoids the interruption due frequently to a sticky masa passing through the extruder or sheeting device of the process, and the use of a dried half-product, a further substantial advance in the art will have been effected.

DISCLOSURE OF THE INVENTION

This invention provides, accordingly, fried food product chips and ribbons and, more particularly, fried corn chips characterized by a friability, compactness, and a reduced oil content of about 12 percent, and most desirably 15 percent, to 25 percent that is manifested in part as a reduced caloric value, without a loss of desirable organoleptic properties, such as texture, aroma, crispness, lightness, color and over-all appearance and, indeed, with an enhancement, it is believed, in taste. The product chips of the invention manifest a significantly enhanced shelf-life, as well.

The term, "chips", as employed herein, is intended to encompass a variety of food product forms including those of conventional rectangular, spiral, ripple, corrugated and elliptical conformation as well as those forms characterized as shells, birds and the like. The term "chips" is intended to encompass short ribbons, as well, that have been cut, illustratively, after the more extended ribbons or bands has left the sheeter or extruder. Other product forms that may be produced from sheeting and extrusion apparatus using the dough or corn masa of the invention are also included within the scope of the present invention. Chips thus produced will have, illustratively, a length, width, and thickness, respectively, of about 1.5 inch (3.81 cm), about 1 inch (2.54 cm) and about 0.030 inch (0.07620 cm). Chips of greater or lesser length, width and thickness are conveniently formed using standard cutting devices usually subject to variable speed control. Accordingly, lengths of 1 inch (2.54 cm) to 2 inches (5.08 cm), widths of 0.5 inch (1.27 cm) to 1.5 inch (3.81 cm); and thicknesses of 0.030 inch (0.0762 cm) to 0.060 inch (0.152 cm) are secured, by way of illustration, using conventional variable speed cut-off knives.

These food chips, and more particularly, fried corn chips and ribbons, are prepared, illustratively, from a variety of corn substrates, the most significantly desirable of which is a corn masa produced by immersing whole kernel corn in water into which is introduced an alkaline agent such as, and preferably, calcium hydroxide. The foregoing mixture is blended and cooked, and successively steeped in an aqueous solution for a period of time sufficient to afford a gelatinization, and in a significantly preferred embodiment, a partial and minimal gelatinization or hydration of the corn. The resulting dough is ground to form a masa.

The masa, incorporating a moisture content of up to 55 percent by weight of the solid components, i.e. corn, and corn components, present is then passed to a sheeting or extrusion phase. In a preferred embodiment the masa is dehydrated to a moisture content of about 8 percent to about 10 percent and sequentially rehydrated in a further aqueous solution to a moisture content of from about 30 percent to 40 percent, before introduction into the extrusion or sheeting phase. The aqueous solution used for rehydration has a temperature, desirably, of about 35° Fahrenheit (F., 1.7° Centigrade, C.) to 60° F. (15.6° C.) and preferably from about 35° F. (1.7° C.) to 40° F. (4.4° C.) to facilitate the retention of lower temperatures in the sheeting or extrusion steps to follow.

The alkaline reagent, such as lime, introduced into admixture with the corn is such as to provide a pH to the masa of from about or precisely 7 to 9. Compounds other than lime may be employed to provide a neutral or alkaline medium but calcium hydroxide is preferred because of the commonly accepted and generally desirable flavor in combination with the taste of the corn it imparts to the fried chips, particularly where this flavor is not overwhelmed by the presence of a high concentration of oil or fat in the chip product.

The masa is dehydrated to provide a more precise control and restraint of the moisture content within the preferred range upon rehydration, but also for shipment or storage thereof prior to extrusion or sheeting.

While less preferred, particularly for commercial usage, the masa, rather than being dehydrated to a moisture content of 8 percent to 10 percent and thereafter rehydrated, may also be partially dehydrated by heating to the preferred moisture content of from about or precisely 30 percent to 40 percent.

This masa may also be used alone or admixed with corn flour, pregelatinized corn flour, or untreated ground corn. Indeed, the foregoing corn flour and unground corn may also be used in the process of the invention in the absence of masa, but their use is significantly less preferred, generally, in securing all of the objectives of the invention.

A desirable combination has, however, been found in the mixture of masa with a pre-gelatinized corn flour, providing a dough that is partially gelatinized and one in which the high moisture content imparted by the masa is reduced by the dry corn flour, thus avoiding dehydration of the masa. Minimizing the moisture content of the masa is also achieved, at least in part, by partially cooking the admixed corn and aqueous alkaline solution so that only minimum or partial gelatinization of the dough results.

Partial cooking of the corn in an aqueous alkaline solution is undertaken to affect a gelatinization consistent with the production of a homogenous masa after grinding of the corn kernels, but one that is not so completely gelatinized as to render the masa or dough ultimately produced by extrusion or sheeting absorptive of a large and undesired concentration of fat and oil in the concluding deep frying step.

In forming a masa for use herein, the dough is, in any event, ground to a particulate or granular size sufficient so that about 20 percent to about 35 percent will pass through a U.S. No. 50 sieve.

The presence of the desired moisture concentration in the masa facilitates extrusion or sheeting of the masa at the reduced temperatures that are a prerequisite of the invention, with minimal cooling means required for this purpose to overcome the heat otherwise generated in the extrusion or sheeting and a concomitant reduction in energy requirements and cost.

The moisture-containing masa is extruded, using a jacketed cooking or forming extruder at a reduced dough or masa temperature within the range of about 75° F. (23.8° C.) to about 90° F. (26.7° C.) and at an elevated pressure of about 1000 pounds per square inch gauge (psig) (70.3 kg/cm$^2$) to about 5000 psig (351.5 kg/cm$^2$).

To retain the foregoing temperature range where sheeting of the masa is to be undertaken, a dehydrated masa is considered particularly preferable so that a maximum quantity of cold water can be introduced into the masa in the rehydration phase prior to the brief but high pressure exerted by the sheeting rolls i.e. in the range of at least about 1000 psig (70.3 kg/cm$^2$) and, more desirably, 3000 psig (210.9 kg/cm$^2$) to 100,000 psig (7030.7 kg/cm$^2$). The higher end of this compression range is preferred in the sheeting step where the foregoing reduced temperature range can be retained in the compression step. Thus a compression range of 5000 psig (351.5 kg/cm$^2$) and most desirably 50,000 psig (3515.35 kg/cm$^2$) to 100,000 psig (7030.7 kg/cm$^2$) is optimal.

An extruder, suitable for use in the practice of the invention, is of a screw-type construction, and is provided, illustratively, with a jacketed barrel and hollow shaft screw adapted for circulation of coolant. Appropriate coolants include cold water, ammonia, fluorinated hydrocarbons, such as those marketed under the trade name, FREON, by E. I. duPont deNemours, Inc., Wilmington, Delaware, and the like.

The dough or masa recovered from the extruder or sheeter is, in a preferred embodiment, cut into discrete segments that will, upon frying, form the desired chips. These sequentially segmented portions of the compressed dough or masa are introduced into the edible oil, such as cottonseed oil, and deep-fried to form the product corn chips.

The severing of individual corn chips from a continuous ribbon following the deep frying step is also available in accordance with the process of the invention by methods known in the art.

Whether cut or uncut before deep frying is undertaken, however, the moisture content of the masa or dough upon emerging from the die of the extruder or the sheeting operation, is not further modified, as for example, by dehydration to form a half-product.

Eliminating the formation of a half-product is particularly advantageous and is essential in forming the compressed, substantially non-cellular chips of the invention. Half product is characterized generally by substantial puffing that takes the form of fluid-containing cells or blisters, incorporating air and residual moisture. Further, because of the usual mode of dehydration that takes place and the inherent character of the dry half-product, the surfaces thereof are substantially impervious to the transmission of air or moisture. The cellular spaces are enlarged upon heating of the food chips in the frying step without substantial absorption of oil in a uniform manner throughout the product chips. While many of the enlarged cellular spaces of conventional half-product will explode upon frying, other cellular spaces will be retained and new ones formed.

The process described herein, thus provides compacted dough or masa, and resulting fried chips substantially free of the cellular air or moisture-containing spaces and case hardened outer membranes present in a conventional half-product. The chips prepared as described herein also have a moisture content that is replaced by the edible oil in, and without extending the duration of, the frying step, but at a significantly reduced level and with a substantially more uniform distribution of the oil throughout the product chips than that normally attainable where half-product is used. The chips of the invention thus avoid a case hardened membrane in which oil is superficially absorbed to provide an oily or greasy texture.

The moisture control sequence described herein in combination with minimal gelatinization of the masa, utilization therein of the particulate whole kernels of corn, the employment of high compression and low temperature in the extrusion or sheeting step, and the employment of the extruded or sheeted masa product without adjusting materially the moisture content thereof prior to frying, have been found to yield the unexpected advantages described herein as manifested characteristically by an oil or fat content, absent flavoring components, of the product corn chips of the invention within the range of about 15 percent to about 25 percent.

The foregoing, and other objects and advantages of the invention, will be evident from the description appearing hereinafter in context with the appended drawing.

DESCRIPTION OF THE PREFERRED EMBODIMENTS

This invention has application, in its preferred embodiments, to the production of fried corn chips from a masa derived from whole kernel corn. Other forms of corn such as corn flour, pregelatinized corn flour, and ground corn, or mixtures of the foregoing with one another may also be used, although their use is significantly less preferred unless, for example, one of these forms, such as pregelatinized flour is used in combination with corn masa.

This invention has application, as well, to alternative farinaceous materials, including potatoes or grain such as rice, wheat, oats, barley, rye, bran and the like.

The whole kernel corn of the preferred embodiment is admixed with water into which is introduced an alkaline reagent, sufficient to provide a masa having a pH of about 7 to about 9; and preferably from 7 to 8.

The mixture is cooked in a conventional treatment tank at a temperature desirably of at least about 212° F. at atmospheric pressure, for a period illustratively of about 15 minutes to about 23 minutes. If desired the cooking may be effected at elevated temperatures i.e. up to 250° F. or more, and pressures, e.g. 5 psig (0.35 kg/cm$^2$) to 25 psig (1.75 kg/cm$^2$) for periods of as little as 5 minutes and up to 23 minutes, although an upper limit of 15 minutes is preferred to accomplish partial rather than complete gelatinization or hydration of the corn kernels in accordance with the present invention.

The alkaline reagent, significantly preferred in the practice of the invention is calcium hydroxide or lime by reason of the generally desirable flavor it is considered to impart to fried corn chips, an advantage enhanced, it is believed, by the present invention where the reduced fat or oil content of the chips renders the chips more susceptible to the subtle flavor imparted by the lime.

Other alkaline reagents may also be used, however, such as ammonium hydroxide, sodium hydroxide, potassium hydroxide, or sodium bicarbonate. Preferably, these reagents, where employed, will be incorporated in minor amounts and used with the lime.

The corn blended with the aqueous lime solution is, after cooking, steeped further in additional water sufficient to cover the cooked corn for a period of from about 7.75 hours to about 11.25 hours and preferably for a period of from 7.75 to 8.25 hours.

The residence time is, in any event, sufficient to permit equilibration of the moisture throughout the blended formulation or mixture. The conditions for moisturization will, of course, vary with the corn employed, its freshness, variety, particulate size and the like. This will be true, as well, where farinaceous materials, such as potatoes, grain and the like replace the corn.

Upon completion of steeping or soaking of the dough, it is successively washed to remove excess hulls, debris and undissolved lime. The preferably partially cooked and steeped kernels are then ground using, conveniently, conventional stone grinders to form a masa having a moisture content of about 45 percent to 55 percent.

The masa so achieved is also characterized by a pH of about 7 to about 9 and preferably 7 to 8 and the ungelatinized ground corn particles have a particulate or granular size of about 35 percent above a U.S. No. 50 sieve size. A typical granulation for use herein is reflected by a screen analysis using U.S. sieve sizes of 0 percent on a No. 12, 20 to 35 percent on a No. 50, and 35 to 50 percent pass through on a No. 100, screen.

The degree of gelatinization effected in the dough masa may be, illustratively, within the range of from a minimum of about 0.198 to a maximum of about 0.263 as measured by blue value; or 144.8 to 231.2 $\mu$ mol of maltose per gram of sample when characterized by digestibility by amylase. A preferred range of gelatinization, as represented by blue value, is from about 0.198 to about 0.2355 and in the coordinate range reflected by the digestibility by amylase, from about 144.8 to about 187.9. When gelatinization is contained within the foregoing ranges, and in combination with the further steps involved in the present invention, as described hereinafter, a marked decrease has been found, unexpectedly, to occur in the absorption of fat or oil by the corn chips so prepared.

The reduced or minimum gelatinization of the dough results in a less glutenous or sticky masa or paste introduced into the sequential extrusion or sheeting step of the present process. As a result, less pressure, within the elevated range required herein, may be employed to achieve the same result, and less energy employed to maintain the reduced temperatures that are essential to the practice described herein.

The blue value determination for amylose in measuring gelatinization by starch content of masa is described in Radley, J. S., *Examination and Analysis of Starch and Starch Products,* page 157 (Applied Science Publications Ltd., 1976).

The test procedure includes dispersing, in a 100 ml volumetric flask, 5 milligrams (mg) of dehydrated masa in 5 milliliters (ml) of distilled water, adding 1 ml of 1N sodium hydroxide and, after stirring, causing the starch to be digested by placing the flask in a bath of boiling water for a period of 2 minutes to secure complete digestion without degradation due to heating alone. The flask is then placed in an ice water bath and 50 ml of distilled water and 1 ml of 1N HCl introduced therein and mixed, followed by 0.1 gram (g) of potassium hydrogen tartrate, and successive addition, after further mixing, of 1 ml of iodine (0.2 g$I_2$ and 2 g KI made to 100 ml). The mixture is further stirred or shaken by placing the flask in a bath of boiling water for a period of 2 minutes for complete digestion without degradation. The flask is then placed in an ice water bath and 50 ml of distilled water and 1 ml of 1N HCl introduced therein and mixed, followed by 0.1 gram (g) of potassium hydrogen tartrate, and successive addition after further mixing of 1 ml of iodine solution (0.2 g $I_2$ and 2 g KI made to 100 ml). The mixture is further stirred or shaken while adding sufficient distilled water to total 100 ml. The same concentration of an identical iodine solution is incorporated in a hundred ml volumetric flask in which sufficient distilled water is incorporated to total 100 ml as a reference standard or blank.

A second or control mixture otherwise identical to the foregoing in which the masa is dispersed is also prepared In this control mixture starch is substituted of known amylose content e.g. a 70 percent amylose corn starch, marketed as AMAIZO-7.

The masa-containing starch of unknown amylose content, the control mixture and iodine solution are permitted to stand for 30 minutes, the blue value of each of the masa-containing dispersion and the control is determined by measuring the absorbance or percentage of light transmittance by spectrophotometric analysis at 680 m $\mu$ using a Bausch and Lomb spectrophotometer Model Spectronic 20 and the following equation in each instance.

$$\text{Blue value} = \frac{\text{absorbance at 680 m}\mu}{\text{mg starch}/100}$$

Using the blue value of the control as a standard, the percentage of amylose is determined by reference to the formula:

$$\frac{\% \text{ amylose in masa}}{\text{test sample}} = \frac{70 \times \text{blue value of unknown}}{\text{blue value of AMAIZO-7}}, \text{ or}$$

$$= \frac{100 \times \text{blue value of unknown starch}}{\text{blue value of amylose}}$$

For the purpose of the present invention the blue value itself without interpolation for amylose concentration, is conveniently used as a measure of desired partial gelatinization incident to securing minimal fat or oil absorption in the product corn chips.

The determination of the range of partial gelatinization when determined by digestibility by amylase is made according to the following test procedure wherein 5 grams of dehydrated masa is dispersed in 100 ml of water to provide a test sample for further processing. $\alpha$-Amylase (0.05 kilogram, kg) is introduced into 100 ml of water where it is distributed with substantial uniformity to provide the enzymatic reagent ("enzyme") for use with the test sample of starch-containing dessicated masa. A color component, 2 g of 3, -dinitrosalicylic acid, 40 ml of 2 N NaOH and 100 ml of water are admixed to form a solution to which 60 g of potassium sodium tartrate is added with water sufficient to form a solution of 200 ml to provide the color reagent for the test procedure.

Five milliliters of starch-containing sample is added to 5 ml enzyme in a 100 ml volumetric flask and 5 ml of starch-containing sample and 5 ml of water are introduced into a separate 100 ml volumetric flask. The flasks are incubated for 30 minutes at 20° C. Into each of the cooled flasks is then introduced 10 mls of the color reagent and the flasks are then reheated in a boiling water bath for 10 minutes and cooled to room temperature. The mixture of each of the flasks is brought to a volume of 100 ml with water. A blank is also prepared containing 5 ml of water to which is added 5 ml of the buffer, K Na tartrate (prepared from a solution of 30 g thereof in 100 ml of water), and the mixture, in turn, made to 100 ml by addition of water in 100 ml volumetric flask.

The absorption is determined, using a spectrophotometer, reading the absorption values at 540 micrometers (mm) against the blank, and subtracting from the absorption value of the enzyme sample the absorption value of the sample in which water is substituted. These values are in turn compared with the calibration curve of maltose (0.025 to 0.250 μmol/ml) and interpolated to a maltose value in μmols. The value of the lower end of the range of desirable gelatinization is then expressed, as indicated hereinabove, as 144.8 μmol maltose per gram of sample and the upper or maximum gelatinization is expressed as 231.2 μmol maltose per gram of sample. These values are achieved, summarizing the data recited above, in the manner described in Table I including the corrected absorption values and the conversion values to maltose micromols appearing in Table II as follows:

TABLE I

| Sample | ml Enzyme | ml HoH | ml of Masa Sample | ml Buffer | Absorption | Corrected* Absorption |
|---|---|---|---|---|---|---|
| A | 5 | | 5 | | 0.688 | 0.646 |
| A' | | 5 | 5 | | 0.042 | |
| B | 5 | | 5 | | 1.066 | 1.043 |
| B' | | 5 | 5 | | 0.023 | |
| blank | | 5 | | 5 | 0.000 | |

*difference between A and A' and B and B'

The conversion to μmols of maltose per gram of masa sample includes the comparison of the corrected absorption of amylose from the masa with the calibration curve for maltose which provides the values appearing in Table II.

TABLE II

| Sample | Corr. Abs. | μmol/ml maltose | μmol maltose/ g sample | Sample |
|---|---|---|---|---|
| A & A' | 0.646 | 0.362 | 144.8 | 5 g |
| B & B' | 1.043 | 0.578 | 231.2 | 5 g |

The final value of amylose digestibility is attained by means of the formula:

$$\mu mol \text{ maltose/g sample} = \mu mol/ml \text{ maltose} \times \frac{100 \text{ ml}}{5 \text{ ml}} \times \frac{100}{g}$$

The practice of the invention is conveniently carried out in a batch or continuous manner and is conveniently and even desirably interrupted, in either case, upon formation of the masa. The apparatus for use, in either event, is well known to those skilled in the art to which this invention pertains. The masa initially prepared with partial gelatinization has a moisture content upon completion of the grinding step of up to about 55 percent, and in any event within a range of about 45 percent to 55 percent generally, by weight of the corn substrate and water present.

In accomplishing the objectives of the invention, the moisture content of the masa upon introduction into the succeeding extruder or sheeting step should not, however, exceed about 40 percent nor should it be less than about 30 percent. These ranges encompass those necessary to assure a decreased fat or oil content in the desired deep-fried product of within the range of about 12 percent, and much preferred, about 15 percent to about 25 percent.

While the masa may undergo an evaporation step after grinding and in addition to that affected by the heat generated in the grinding step to achieve the foregoing reduced moisture level, followed by cooling of the masa prior to its introduction into the extrusion or sheeting phases, this procedure is, in practice, cumbersome, and it is preferable to dehydrate the masa initially by conventional means to a concentration of about 8 percent to about 10 percent by weight of moisture. The masa may then be rehydrated more precisely to the desired concentration prior to extrusion or sheeting and the temperature of the masa reduced using water having a temperature of from 35° F. (1.7° C.) to 45 F. (7.2° C.) and preferably from 35° F. (1.7° C.) to 40° F. (3.8° C.).

This method is particularly convenient for transportation and storage where the masa is prepared in a site removed from that in which it is converted to fried corn chips as described in detail hereinafter.

Dehydration of the masa followed by rehydration prior to compression also permits precise regulation of the moisture concentration as well as the temperature of the masa being introduced into the extruder or sheeting step.

The introduction of the water into the dehydrated masa at a reduced temperature is of particular relevance where the ground dough or masa is subjected to the extremely high pressure of sheeting rolls, and where reduced temperature control means are unavailable. This difficulty is, in part, counteracted by the shorter residence time of the masa in the nip of the sheeting rolls, as described hereinafter, in contrast with the time consumed by passage of the masa through the extruder. Extrusion of the masa is, nevertheless, particularly preferred.

Figure 1:
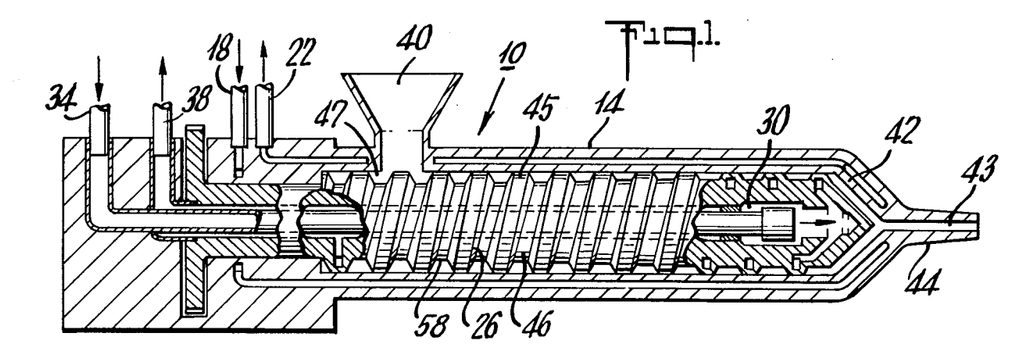
FIG. 1 is a fragmentary longitudinal sectional, partially perspective, view of a portion of the apparatus employed in one embodiment of the invention.

Suitable cooking or forming extruders incorporating augers or screws of known construction may be used in the practice of the invention. The extruders used provide even pressures, kneading and homogeneity to the masa or dough being compressed, and can be employed effectively in maintenance of the reduced temperatures that are required herein while operating continuously, if desired, even with the masa or dough of reduced moisture content also necessary to practice of the invention. An illustrative embodiment of cooking extruder 10 is shown in FIG. 1 of the drawings and includes a jacketed barrel 14 adapted to transmit fluid coolant through its interior from the inlet line 18. This fluid is removed through the exit line 22 and recycled after being cooled, if desired. Suitable illustrative coolants include water, ammonia and fluorocarbons such as those marketed by E. I. duPont de Nemours Corporation, Wilmington, Del., under the trade name, FREON.

The cooking extruder screw 26, positioned inside the barrel or jacket 14 has, itself, a hollow shaft 30 for circulation of coolant fluid or like composition received by means of the inlet line 34 through the length of the screw 26 and removed therefrom by means of the outlet line 38.

The dough or masa is passed to the extruder through the hopper 40 and emitted from the extruder 10 at the main or final extrusion head 42 through the die orifice 43 of the die 44.

The pitch of the extruder screw 26 is constant throughout its length. While the diameter of the flights 45 of the screw also remain constant, the channel 46 between the flights has a decreasing depth and correspondingly increasing diameter commencing at the inlet or feed end of the extruder. Thus, the channel 46 of the screw 26 is of a smaller diameter, for example, two inches in depth, adjacent the hopper 40, providing at the inlet end 47 of the extruder 10 a large cross-sectional area within the barrel 14 for receiving masa. The depth of the channel is decreased to about one-half inch in the terminal or compression zone, also termed the main or final extrusion head 42 communicating with the die 44 and exit orifice 44. The channel depth remains constant throughout the extruder length where a forming extruder is used.

The high compression required in the practice of the invention is exerted on the masa in the compression zone and exit orifice 43 and attains a level within the range of about 1000 psig (70.3 kg/cm²) to about 5000 psig (351.5 kg/cm²), and preferably from 1000 psig (70.3 kg/cm²) to 3500 psig (246.1 kg/cm²). Extruder pressures of up to 3000 psig (210.9 kg/cm²) have proven very satisfactory for most applications.

The increased shear of the final extrusion head 42 enhances the kneading, blending and plasticization of the masa as well as effectively reducing and compressing the air spaces present in the masa. This pressure is sustained in the die orifice 43 through which the masa is transmitted to form a ribbon that is normally cut into small pieces of compressed dough or masa that are then fed or dropped into a fryer containing an edible oil.

As indicated, critical to the success of the invention is the retention of a reduced temperature and maintenance of a moisture content of 30 percent to 40 percent, in the masa or dough composition through completion of the extrusion step and with immersion of the cut pieces of masa or dough into the deep frying phase. This moisture retention prior to and during extrusion and immersion in the fryer tends to prevent the formation of organoleptically unacceptable corn chips while assuring the reduced oil concentration of the invention. At the same time, maintenance of the masa or dough temperature in the final extrusion head or compression zone within the range of 60° F. (14.4° C.) and more frequently from 75° F. (23.9° C.) to about 90° F. (32.C.), but preferably not in excess of 80° F. (26.7° C.), obviates blistering or puffing of the dough and the availability of these sites for absorption of oil in the frying.

The dough temperature is normally increased in transmission of the dough or masa through the die orifice but is retained, in accordance with the invention, within a range of about twenty degrees above that occurring in the final extrusion head, that is, within a range of 80° F. (26.7° C.) to 110° F. (43.3° C.) and preferably from 95° F. (35° C.) to 100° F. (43.3° C.).

The extruded dough or masa emitted from the extruder die orifice 43 in ribbon form manifests a thickness of from 0.030 inch (0.07620 cm), and more desirably, 0.032 inch (0.08128 cm) to 0.060 inch (0.152 cm). To assure this thickness and a convenient width of about 0.5 inch (1.27 cm) to 1 inch (2.54 cm), the die orifice has a height of from about 0.03125 inch (0.07938 cm) to about 0.75 inch 0.047 inch (0.11938 cm) and a width of about 0.5 inch (1.27 cm) to about 1 inch (2.54 cm) or slightly in excess thereof.

Illustrative extruders for use herein are those manufactured by the Wenger Manufacturing Corporation, Sabetha, Kans., not characterized as the x-200, x-175, x-155, x-25 and x-20 cooking extruders. A cooking extruder of this type of construction is shown, illustratively, in FIG. 1 and described hereinabove. These cooking extruders are particularly useful in the present process in that coolant is readily substituted for steam or other heating composition for circulation through the extruder's temperature control means. Extruders having twin screws may also be used desirably in the practice of the invention.

The highly compressed dough or masa emerging from the die 44 as a ribbon is conveniently severed at standard intervals in one embodiment by conventional rotating cutoff knives (not shown) the rate of the movement which can, of course, be varied to modify the size of the pieces of dough or masa. The individual pieces of masa are received on an endless conveyor belt from which they are deposited into a conventional deep fryer or deposited directly into the fryer after being cut.

The frying temperature is maintained at about 320° F. (160° C.) to 420° F. (215.5° C.) and preferably at about 380° F. (193.3° C.) for a period of about 30 seconds to 90 seconds and most desirably about 40 seconds. The corn chips are moved through the fryer by conventional mechanical means.

The edible oil employed is a vegetable oil, illustratively, cottonseed oil, corn oil, partially hydroginated soy bean oil and the like.

The resulting corn chips are drained of the excess oil and flavored by tembling or dusting with salt, spices or other seasoning and packaged.

The corn chips so prepared contain from 15 percent to 25 percent by weight of fat or oil and are simultaneously light and crispy, without the toughness inherent in certain chips prepared from a half material or half-product that has been dried prior to immersion in the frying oil.

Extrusion is preferred, normally, over other methods of preparation because of the means it provides for elevated compression with convenient means available for sustaining reduced temperatures using existing equipment albeit the equipment has been used predominantly heretofore for cooking rather than cooling. Further, extrusion provides better blending and a more uniform product, which is secured while simultaneously compressing masa; an efficiency absent, for example, where the masa is sheeted. Still further, as will be observed from the description appearing herein, much high compression is utilized in sheeting, indeed up to 100,000 psig (7030.7 kg/cm²), with an enhanced energy cost.

Sheeting of the masa is however practicable; and where equipment capable of securing compressive forces at the high end of the range recited herein is available, provides a desirable alternative to extrusion. Sheeting can, however, be effected at pressures as low as 1000 psig (70.3 kg/cm²), but to assure the low fat or oil content in the deep fried corn chips of the invention a pressure of 3500 psig (246.1 kg/cm²) and, indeed, within the range of 50,000 psig (3515.35 kg/cm²) to 100,000 psig (7030.7 kg/cm²) is significantly preferred. When the latter pressures are utilized preceded by effective blending, the objectives of the invention are ably secured.

Blending of the masa occurs as a separate step immediately prior to introduction of the masa on to a spreader belt for transmission to the compression rolls. Blending takes place in any conventional mixing vessel, preferably in a continuous process, a 2-stage continuous mixer in which the second stage mixing component controls the mixing level and meters the discharge of the masa on to the spreader belt.

The masa is that prepared and described for use in extrusion and is, again, preferably one that has been dehydrated to a moisture concentration of 8 percent to 10 percent by weight and is rehydrated in the two-stage blender or mixer. The blending apparatus and process thus described are used desirably in transmitting masa or dough to the forming extruder 10, as well, particularly where the masa is to be rehydrated.

Figure 2:
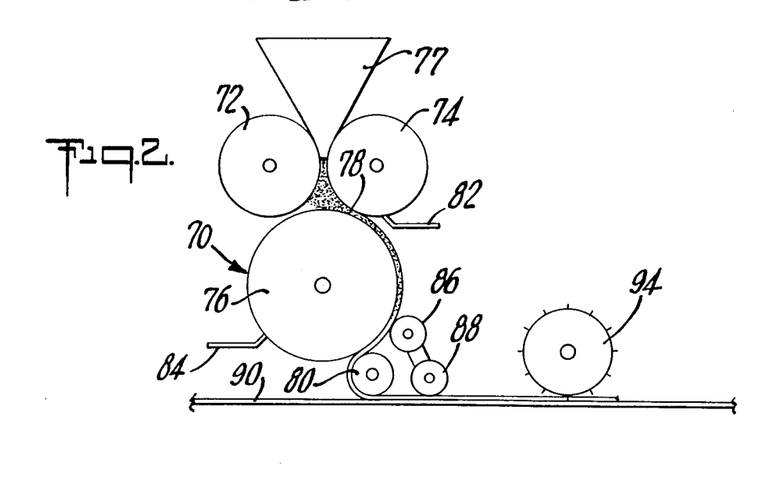
FIG. 2 is a fragmentary schematic side elevational view of a portion of the apparatus in a second embodiment of the present invention.

The sheeting apparatus and process for use in a preferred embodiment of the invention are described advantageously by reference to FIG. 2 of the drawing wherein the sheeting apparatus 70 includes a plurality of rolls. The three principal rolls are the rear roll 72, the top sheeting roll 74, and the bottom sheeting roll 76. The flow of masa is metered to the sheeting apparatus 70 by the second stage blender (not shown) and delivered to the hopper 77 and on to the top of the bottom sheeting roll 76.

It is the purpose of the rear roll 72 to compact the dough and maintain an even feed pressure and distribution across the feed nip 78 of the sheeting roll 74 and 76.

The sheeting rolls 74 and 76 are driven at the same speed. The bottom roll 76 is stationary and the top roll 74 is vertically adjustable. The rear roll 72 and the bottom sheeting roll rotate in a clockwise manner, and the top sheeting roll rotates counter-clockwise. The compressive force or pressure between the sheeting rolls 74 and 76 using this preferred apparatus is in the range of 50,000 psig (3515.35 kg/cm$^2$) to 100,000 psig (7030.7 kg/cm$^2$). As indicated, the compressive forces may be reduced to as little as about 1000 psig (8.4 kg/cm$^2$), but these reduced pressures are significantly less preferred.

The rolls of the preferred apparatus, when exercising a compressive force of 100,000 psig (7030.7 kg/cm$^2$), operate at a negative clearance of 0.020 inch (0.0508 cm) to 0.030 inch (0.0762 cm) in the absence of masa passing between the two sheeting rolls.

The moisture content of the masa as it passes through the sheeting rolls is within the range of about 30 percent to 40 percent. The latter, broader range is operative in the sheeting process, however.

The moisture content of the compressed dough or masa, upon completion of sheeting or extrusion, and upon entry into the fryer, is maintained substantially unchanged from that present in the dough masa when it is introduced into the sheeter or extruder. Accordingly, the reduction in moisture content does not exceed an amount in excess of about 5 percent, and preferably, 1 percent to 2 percent of the total weight of dough or corn masa and water being treated.

The dough or masa temperature, after sheeting and before frying, is normally lower, i.e. 60° F. (15.6° C.) to 80° F. (26.7° C.), than that employed in extrusion, but so long as a temperature within a broader range of 60° F. (15.6° C.) to 110° F. (43.3° C.) is maintained, the desired low fat content friability, freshness, taste, and the like, can be secured in the product corn chips.

Since the sheeted masa tends to stick to the bottom roll 76, a pick-off roll 80 is placed adjacent the downstream side of the bottom roll 76 and rotated in a direction counter to that of the bottom roll 76. TEFLON polyfluoroethylene coated brass scrapper blades 82 and 84 are set against both the top sheeter roll 74 and the bottom sheeting roll 76 respectively, to prevent masa from remaining on the rolls and returning to the roll nip 78.

To sustain a pliant, relaxed but continuous sheet of the masa leaving the sheeting rolls, dancer rolls 86 and 88 are placed, respectively, against the sheet of masa as it passes about the bottom roll 76 and the pick-off roll 80 and is transmitted from the sheeter conveyor belt 90 to the cutting and frying stages of the instant process. The sheet of masa has a thickness within the range defined for extrusion, that is 0.030 inch (0.0762 cm) to 0.060 inch (0.152 cm). The masa passes, in a preferred embodiment, through the die cutter 94 wherein the sheet is cut into chips. The cut chips are retained on the sheeter conveyor belt 90 and transmitted over the nose bar (not shown) into the fryer (not shown). The frying temperature of the oil is maintained, as with extrusion, at a temperature of about 320° F. (160° C.) to 420° F. (215.5° C.) for a period of about 30 seconds to 90 seconds.

The sheeting apparatus of the preferred embodiment permits the extruded masa to have a width capable of being cut into several parallel ribbons each of which is then cut into a series of chips.

It is also feasible to feed the ribbons formed in the extrusion or sheeting steps directly into the fryer. The individual ribbons are then cut into individual chips, in this embodiment, after the ribbons have been deep fried and removed from the fryer by means, for example, of a standard breaker wheel on to a standard inclined wire mesh conveyor belt. Residual unabsorbed oil, if present, may drain through the belt. Each ribbon is then cut into individual chips. No special equipment or process, such as oil mops or high velocity moving air or the like, is required.

Flavoring elements, such as salt, herbs, and the like, are added to the fried chips conveniently in a conventional tumbler where the flavoring materials are applied by dusting on the surface of the chips. The chips are delivered to the tumbler, optionally, in one embodiment, and whether cut or after frying, from a wire mesh belt as aforesaid.

The product chips of the invention will be characterized generally by a flavoring content of 1 percent to 8 percent by weight. Corn will constitute, characteristically, about 70 percent to about 80 percent, and oil or fat, 15 percent to 25 percent.

The following examples are further illustrative of the invention:

EXAMPLE I

A corn masa is prepared from whole kernel corn cooked and steeped in an aqueous lime solution, washed and ground to a coarseness defined by the following screen analysis upon dehydration to a moisture content of from 8 percent to 10 percent. The indicated percentages of masa are retained on the recited U.S. sieve sizes unless otherwise expressly indicated:

TABLE III

| U.S. sieve size | % retained |
| --- | --- |
| 20 | 28.46 |
| 30 | 18.265 |
| 40 | 16.05 |
| 50 | 10.44 |
| 80 | 14.815 |
| 100 | 7.35 |
| pass through | 4.62 |

The dehydrated masa is rehydrated by the addition of water having a temperature of 40° F. (4.4° C.) to a total moisture content of 35 percent in a ribbon type bath mixer. The masa is mixed until equilibration of the moisture is obtained throughout the blended formulation. The finished masa is fed into a former extruder such as described hereinabove and illustrated generally in FIG. 1. The pressure is increased in the compression or pumping zone of the final extrusion head and attains a level of 3000 psig (210.9 kg/cm$^2$) at the head 42 and extrusion die orifice 43. Coolant liquid is circulated through the temperature control circulatory means provided in the shaft of the extruder's screw and the extruder barrel to yield a dough temperature in the main extruder head of 80° F. (26.7° C.). The temperature will, of course, be less than 80° F. (26.7° C.) in the initial feed zone of the extruder where the shear is less. The die orifice is 0.03125 inch (0.07938 cm) high or thick and 0.75 inch (1.905 cm) wide. The resulting dough or masa emitted as a continuous ribbon from the die orifice has a thickness of 0.035 inch (0.889 cm).

The highly compressed masa ribbon has a temperature of 100° F. (85° C.) upon leaving the extruder and is formed into individual pieces by a variable speed cut-off knife to a length of 1.5 inch by 1 inch in width. The pieces fall into a fryer, through which the pieces are moved during a period of 40 seconds by mechanical means. The frying medium is cottonseed oil heated to a temperature of 380° F. The chips are recovered from the fryer, drained and sequentially tumbled in salt to provide deep fried corn chips having a corn content of 76.5 percent, 22.0 percent of oil, and 1.5 percent salt.

EXAMPLE II

The process of Example I is repeated using clean whole kernel corn, that has been steeped in lime, cooked, ground into a masa having a screen analysis as follows on the indicated U.S. Sieve sizes: retained on U.S. #12 screen: 0 percent; retained on U.S. #50 screen: 20%-35%; and through a U.S. #100 screen: 35% to 50%. The masa is dehydrated to a moisture content of from 8 percent to 10 percent and thereafter rehydrated to a concentration of 65 percent corn dough and 35 percent water. The masa is formed, and extruded, as described in Example I, employing the temperatures and pressures of Example I, with coolant water maintained in the barrel of the extruder. The temperature of the masa upon leaving the extruder is the same as in Example I; and passage of the cut pieces of half-product through the fryer is accomplished in the same period of time and using the same frying medium, i.e. cottonseed oil, and frying temperature. After drainage of oil from the fried chips and tumbling of the chips in salt, there are obtained fried corn chips having, by weight, 78.5 percent corn, 20.0 oil, and 1.5 percent salt.

EXAMPLE III

The procedure of Example I is repeated using the pressures, temperatures and residence times of Example I. The corn masa of Example II is used in the process and the masa is rehydrated prior to extrusion and setting the extruder die orifice so that a ribbon of compressed mada of 0.047 inch (0.119 cm) is emitted by the extruder for cutting and frying.

EXAMPLE IV

400 Pounds of a batch of whole kernel corn of pale yellow hybrid variety is placed in a steam jacketed cooking kettle into which 80 gallons (302.83 liters) of water is metered and the mixture brought to a temperature of about 150° F. (65.6° C.). 3 Pounds, 11 ounces (1.81 kg.) of lime is added and the mixture is partially cooked for 15 minutes after reaching the boiling point at atmospheric pressure. Steam pressure applied to the kettle jacket is about 12 psig (0.84 kg/cm²) at 244° F. (117.8° C.). The cooked corn is discharged into a portable transfer tank and 70 gallons (264.97 liters) of cold water is added by rinsing the cooking kettle into the transfer tank and the entire corn and water mixture pumped into a rectangular steel, open top soaking tank of approximately 240 gallons (908.48 liters) capacity. The corn is levelled in the soaking tank so as to be completely covered with water, then allowed to soak quiescently for 8 hours ±15 minutes. After soaking is completed, a batch is pumped to a rotary washer where the corn is washed by spraying with fresh water to remove corn hulls, other debris and residual lime, which are discarded. The corn dough is ground using mechanical stone grinders. The moisture content of the masa is about 45 percent to 54 percent by weight. The coarseness of the ground dough or masa is determined to have a screen analysis as follows: retained on a U.S. sieve size #12, 0 percent; on a #50 screen, 20 percent to 35 percent; and through a #100 screen, 35 percent to 50 percent.

The foregoing masa has a moisture content of 45 percent to 54 percent. The masa is dehydrated to a moisture content of 8 percent to 10 percent by weight in a conventional dessicator.

The foregoing masa is rehydrated to a total moisture or water content of about 35 percent and is fed into the hopper of the cooking extruder of the type employed in Example I hereof and described heretofore in connection with FIG. 1 in which coolant fluid is substituted for a heated fluid in the jacket and in the hollow shafts of the extruder screws.

The masa is extruded employing the dough or masa temperature and extruder pressures of Example I. The masa is extruded in 48 discrete, flat ribbons of 0.625 inch (0.0338 cm) and 0.060 inch (0.524 cm) thickness. The ribbons are simultaneously cut into lengths of 1.75 inch (1.91 cm) ±0.25 inch (0.635 cm) as the ribbons emerge from the extruder head. The cut masa pieces fall directly into a fryer containing vegetable cooking oil maintained at a temperature of 400° F. (204° C.) to 405° F. (207° C.) through which the cut pieces are moved by standard mechanical means in a period of about 40 seconds, and upon emerging from the fryer, are drained and tumbled in salt. The oil content of the resulting corn chips based on the weight of the total ingredients present, is within the range of about 15 percent to 25 percent.

EXAMPLE V

A corn masa is prepared by the immersion of clean, whole corn in water with the addition of lime. The mixture is cooked and permitted to soak in an aqueous lime solution for up to 10 hours. It is then washed and the dough ground to a coarseness reflected by the following screen analysis:

| U.S. sieve size retained | Percentage |
| --- | --- |
| On #20 | 3.5 |
| On #40 | 47.36 |
| On #80 | 24.47 |
| On #160 | 9.81 |
| On #320 | 5.62 |
| passed through #320 | 9.24 |

The corn masa has a pH of 7 to 8 and a moisture content of 50 percent and is mixed in a ratio by weight of 3 parts of masa to 1 part of pregelatinized corn flour to provide a dough composition having a total moisture content of about 35 percent. The corn flour has a granulation reflected by a U.S. screen analysis as follows:

| Passing through a U.S. sieve size | Percentage |
|---|---|
| #20 | 99.8–100 |
| #100 | 21.6–28.3 |
| #200 | 8.7–13.7 |

The mixture is cooled to a temperature of about 40° F. (4.4° C.) and the cooled masa and flour dough composition is blended in a 2-stage mixer, e.g. a Werner Lehara blender, in which the masa and dough composition is mixed in the blender's first stage. Blending is continued in the second stage with a metered discharge of the masa-flour dough mixture on to a conventional spreader belt from which the composition is fed into the sheeter 70 of FIG. 1 described hereinabove. The masa-containing composition is fed on to the bottom roll 76 of the sheeter 70 between the rear roll 72 and the top sheeting roll 74. The rear roll 72 is located by means of jack screws (not shown) and is set with spacers at a distance of 1.625 inch (0.8775 cm) from the roll 74. That portion of the dough in contact with the rear roll 72 is compacted and an even feed pressure is sustained across the nip 78 of the top sheeting rolls 74 and 76, so that the outer margins of the sheeting rolls compress the dough fed to the nip, as well.

The sheeting rolls are driven at the same speed through a gear arrangement and its own motor with remote control (not shown). The top roll is adjusted up and down by its own system of remotely controlled gear motor and coupled jack screws (not shown). Adjustment of the roll clearance at the nip 78 is made by breaking the coupling between the jack screws and moving a master jack screw present up or down. The means for exercising control are well known to those skilled in the relevant art.

The counter clockwise rotation and spaced relation of the top sheet roll 74 to the clockwise rotating bottom roll 76 in context with the metered feed and the distribution effected by the clockwise rotation of the rear roll 72 are such as to effect a pressure of a 100,000 psig (7030.7 kg/cm$^2$) on the dough mixture passing through the nip 78 of the sheet rolls. The sheet rolls operate on the basis of a negative clearance of 0.20 inch (0.508 cm) to 0.30 inch (0.774 cm). The pressure thus exerted is manifestly brief so that heating of the previously cooled masa-containing dough is minimized while compressing the dough to a uniform thickness of 0.035 inch (0.0889 cm). The dough sheet after passing about the bottom roll 76, and on to the pick-up 80 roll and sheeter belt 90 proceeds to the die cutter 94. The dancer rolls 86 and 88 set in place against the bottom roll 76 and the sheeter belt 90 exert little pressure on the dough sheet but serve as guides to relax the sheet emerging from the nip 78. The dough and dough sheet are kept on the rolls by means of side guides (not shown) mounted about the lateral margins of the rear and sheeting rolls. Scrapper blades 82 and 84 are so disposed as to remove any dough that is not transmitted to the sheeter belt 90. It is important to remove dough at the appointed sites from the sheet rolls so that a buildup of dough does not occur against the side wall guides with a consequent increase in temperature of the guides by virtue of friction since a minimization of heat is necessary to the successof the present process. The temperature of the dough after sheeting in the present example is within the range of 80° F. (22.2° C.) to 100° F. (37.8° C.). The sheeting operation is carried out in an air-conditioned environment where the temperature is maintained at about 70° F. (21° C.). The dough sheet is 40 inches (101.6 cm) wide by 0.022 inch (0.0559 cm) and is cut as it is transmitted along the conveyor belt 90 into chip pieces of 1.75 inch squares. The die cutter 94 bears a plurality of blades made of Delvin each, in the form of a square of 1.75 inch width and thickness. The blades are replaceable. The cutting roll is adjustable vertically by means of a hand wheel (not shown) which drives coupled jack screws.

The cut pieces of dough remain on the sheeter belt and go over the nose bar thereof (not shown) and are dropped on to a conventional bottom restrainer belt of a fryer containing cottonseed oil maintained at 380° F. (1933° C.). Scrap is removed from the sheeter belt automatically by known means and recycled to the Werner Lehara blender.

The cut pieces of compressed corn dough are moved through the fryer in a period of 40 seconds and are recovered, drained of oil and tumbled in salt to provide corn fried chips composed of 57.4 percent of corn, 19.1 percent corn flour, 22.0 percent cottonseed oil, and 1.5 percent salt.

EXAMPLE VI

The process of Example V is repeated using a corn masa, as prepared in Example I, having a moisture content of 50 percent, and in which the masa is dehydrated to about 8 percent to 10 percent by weight and rehydrated to a moisture concentration of 35 percent. The rehydration is accomplished using cold water having a temperature of 40° F. (4.44° C.). The masa is then sheeted and processed as described in Example IV. The product corn chips recovered from the fryer are drained and tumbled in salt to provide salted and fried corn chips having a reduced fat concentration.

EXAMPLE VII

The following dough mixtures are employed using the process of Example I to provide deep fried corn chips (after frying in cottonseed oil and draining of the oil therefrom) that have an oil content of from 15 percent to 25 percent.

| (a) | Corn (Dry-Powder) | 32.5 |
|---|---|---|
| | Corn Flour | 32.5 |
| | Water (total moisture content) | 35 |
| (b) | Corn (Dry-Powder) | 32.5 |
| | Corn Meal (Fine) | 32.5 |
| | Water (total moisture content) | 35 |
| (c) | Corn (Dry-Powder) | 32.5 |
| | Corn (Dry-Granular) | 32.5 |
| | Water (total moisture content) | 35 |
| (d) | Corn (Dry-Granular) | 70 |
| | Water (total moisture content) | 30 |

EXAMPLE VIII

Four batches of fried corn chips are prepared in the same manner, but for the variations expressly recited hereinafter, by immersion of whole kernel corn in water with addition of calcium hydroxide, cooking and subsequent steeping in an aqueous lime solution, washing and grinding of the resulting dough, dehydration thereof to 8 percent to 10 percent by weight and rehydration to a moisture concentration of 35 percent. The chips, "Chips A" and "Chips C" hereinbelow, prepared in accordance with the invention, are, in each instance, blended with subsequent extrusion as described in Example I wherein the extruder screw shaft and barrel contain water as a circulating coolant. A series of extrusion head units is used to form the extruder assembly. The samples, "Chips B" and "Chips D", are prepared on a standard sheeting apparatus. The masa, upon completion of extrusion or sheeting, has a dough temperature of 80° F. (26.7° C.) to 100° F. (37.8° C.). The thickness of the pieces of extruded masa are 0.035 inch (0.089 cm). All of the corn chips prepared are fried in fresh cottonseed oil at a temperature of 400° F. for 50 seconds and then drained.

The variations in preparation of the four batches of fried corn chips are otherwise as follows:

"Corn Chips A" are produced using a masa subjected to partial cooking and a minimum gelatinization measured by a blue value (found) of 0.198 and a coordinate digestibility by amylase (found) of 144.8. The masa used in the preparation of Corn Chips A is subjected to a pressure of 2000 psig (140.6 kg/cm$^2$) in the compression zone constituting the final extrusion head of the extruder.

The second preparation of corn chips, "Corn Chips B" is prepared using a reduced compression of 120 psig (8.4 kg/cm$^2$), with the same minimum gelatinization.

The third preparation or formulation, "Corn Chips C", is prepared using the high compression extrusion employed in making Corn Chips A, but with substantially complete cooking and maximum gelatinization of the dough used in preparing the masa, so that the masa manifests a blue value 0.263 (found) and a digestibility by amylase of 231.2 (found).

"Corn Chips D", the final formulation, is prepared in the manner of "Corn Chips B" using the sheeter compression of 120 psig (8.4 kg/cm$^2$) employed in producing Corn Chips B, but with the extended cooking and maximum gelatinization of Corn Chips C.

The foregoing formulations of fried corn chips, Corn Chips A, B, C and D, manifest the following oil concentrations after recovery from the fryer and drainage at room temperature under identical conditions and for like periods of time.

| Fried Chips | Concentration of Oil/Fat (%) |
| --- | --- |
| A | 22 |
| B | 32 |
| C | 24 |
| D | 35 |

It is manifest from the foregoing table that high compression as practised in the preparation of Corn Chips A and C results in fried corn chips of a significantly reduced concentration of oil or fat when compared with those fried corn chips, Corn Chips B and D prepared at reduced pressure i.e. psig (8.4 kg/cm$^2$). It will be apparent, too, that even with the maximum gelatinization employed in preparing Corn Chips C a very material reduction of the oil or fat content of these chips is secured using the compression and reduced temperature coming within the present invention.

In addition to the enhanced low caloric content of the low fat corn chips of the invention obtained without loss, and indeed, it is believed, with enhancement of their organoleptic properties, the product chips manifest a materially increased shelf life when compared, illustratively, with conventional corn chips of much higher fat or oil content and with low fat corn chips prepared from a dry half-product.

The time during which the dough or masa is subjected to extrusion or sheeting at the high compression levels of the invention varies inversely and within a variable range, with the pressures exerted. In general, however, exposure to the pressures required by the present invention i.e. at least 1000 psig within either the extruder or sheeter is for a period of at least 0.05 seconds and up to about 60 seconds, although pressures of shorter and, indeed, much longer duration may be utilized. A period of exposure of from 0.05 seconds to 24 seconds is generally preferred. A shorter time period within the foregoing range, e.g., 0.05 seconds to 1 second, is normally preferred, however, where the dough or masa is being compressed in the sheeter at a pressure of 50,000 psig or more, whereas a longer time period, for example, 10 seconds to 24 seconds, is preferred in the event an extruder is used and the compression maintained is from 1000 psig to 3500 psig.

It will be evident that the terms and expressions that have been employed herein are used as terms of description and not of limitation. There is no intention in the use of such terms and expressions of excluding equivalents of the features shown and described or portions thereof, and it is recognized that various modifications are possible within the scope of the invention claimed.

What is claimed is:

1. A process for preparing food product chips or ribbons comprising subjecting a comminuted starch-containing food composition having a moisture content of from about 30 percent by weight to about 40 percent by weight to compression at a pressure of at least 1000 psig and at a temperature of from 60° F. to about 110° F. and sequentially frying said composition in an edible oil without an intermediate drying step, whereby a substantial portion of said moisture content is retained during the period of compression and introduction of said starch-containing composition into said frying step.

2. A process as claimed in claim 1 wherein said starch-containing food composition is corn.

3. A process as claimed in claim 1 wherein said starch-containing food composition is whole kernel corn, said corn being partially cooked and partially gelatinized, steeped in an aqueous alkaline solution and ground into a masa.

4. A process as claimed in claim 3 wherein said masa has a moisture content of up to about 55 percent, is thereafter dehydrated to a moisture content of from about 8 percent to about 10 percent, and rehydrated to a moisture content of from about 30 percent to about 40 percent by weight.

5. A process for preparing deep fried corn chips having an oil or fat contant of from about 15 percent to about 25 percent that comprises subjecting a composition of corn masa, corn flour, ground corn or a mixture of two or more of the foregoing, having a moisture content of from 30 percent to 40 percent by weight to a pressure of at least 1000 psig in an extrusion or sheeting process at a temperature of from 60° F. to 110° F. and sequentially deep frying said composition without an intermediate drying step, whereby a substantial portion of said moisture content is retained during the period of compression and introduction of said composition into said frying step.

6. A process as claimed in claim 5 for preparing deep fried corn chips that comprises preparing a corn masa having a moisture content of from about 30 percent to about 40 percent, extruding said masa at a temperature of from 60° F. to 110° F. at a pressure of 1000 psig to 5000 psig, and, without drying, deep frying said extruded masa.

7. A process as claimed in claim 6 wherein said masa is recovered from said extrusion as a ribbon having a thickness of from 0.03 inch to 0.06 inch and cut into a plurality of pieces prior to said frying.

8. A process as claimed in claim 5 for preparing deep fried corn chips that comprises preparing a corn masa having a moisture content of from about 30 percent to about 40 percent, sheeting said masa at a temperature of from 60° F. to 110° F. and at a pressure of from about 50,000 psig to about 100,000 psig to form a compressed masa, and, without drying, deep frying said compressed masa.

9. A process as claimed in claim 8 wherein said compressed masa is formed into a ribbon upon completion of the sheeting thereof and is cut into a plurality of pieces prior to deep frying thereof.

10. A process as claimed in claim 6 wherein said masa has a pH of from about 7 to about 9.

11. A process as claimed in claim 6 wherein said masa has a granulation of at least 35 percent above a U.S. sieve size No. 50.

12. A process as claimed in claim 8 wherein said masa is prepared from whole kernel corn having a granulation of about 35 percent above a U.S. sieve size No. 50 and said masa has a pH of from about 7 to about 9.

13. A process as claimed in claim 5 wherein said masa is prepared by admixing water, an alkaline agent, and whole kernel corn, cooking said corn and thereafter steeping said mixture in an aqueous alkaline solution, grinding the particulate corn composition present in said solution to form said masa, washing, and sequentially drying said masa to a moisture content of from about 8 percent to about 10 percent; rehydrating said masa to a moisture content of from 30 percent to 40 percent by weight thereof, and extruding said masa at a temperature of from 80° F. to 110° F. under a pressure of about 1000 psig to 3500 psig.

14. A process as claimed in claim 13 wherein rehydration of said masa is undertaken using water at a temperature of 35° F. to 50° F.

15. A process as claimed in claim 5 wherein said mixture consists essentially of corn masa and pregelatinized corn flour.

16. A process as claimed in claim 13 wherein said cooking results in partially gelatinized masa having a blue value within the range of 0.198 to 0.263 and a coordinate value as measured by the digestibility by amylase of 144.8 to 231.2.

17. A process as claimed in claim 16 wherein said blue value is within the range of about 0.198 to 0.236 and the value as measured by the digestibility by amylase is within the range of about 144.8 to about 187.9.

18. A process that comprises sheeting or extruding at a temperature of from 60° F. to 110° F. at a pressure of at least 1000 psig a corn masa having a moisture content of about 25 percent to 40 percent by weight of said masa to form a compressed masa in which a substantial portion of said moisture content is retained, and without an intermediate drying step, deep frying said compressed masa.

19. A process as claimed in claim 18 wherein said corn masa is at least partially gelatinized to a blue value of from 0.198 to 0.236.

20. A process as claimed in claim 18 wherein said corn masa is at least partially gelatinized to a digestibility by amylase value of 144.8 to 187.9.

* * * * *